(12) United States Patent
Nakasuji et al.

(10) Patent No.: US 7,576,782 B2
(45) Date of Patent: Aug. 18, 2009

(54) IMAGE PICKUP APPARATUS AND CONTROL METHOD THEREFOR

(75) Inventors: Motohiro Nakasuji, Kanagawa (JP); Fumihiko Sudo, Kanagawa (JP); Takashi Kameyama, Kanagawa (JP); Katsumi Kaneko, Kanagawa (JP); Kazuyuki Marukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 10/892,635

(22) Filed: Jul. 16, 2004

(65) Prior Publication Data

US 2005/0036055 A1 Feb. 17, 2005

(30) Foreign Application Priority Data

Jul. 18, 2003 (JP) ............................. 2003-276806

(51) Int. Cl.
*H04N 5/228* (2006.01)
*H04N 5/222* (2006.01)
(52) U.S. Cl. ................................. 348/222.1; 348/333.01
(58) Field of Classification Search ............ 348/333.05, 348/312, 222.01, 333.01
See application file for complete search history.

(56) References Cited

U.S. PATENT DOCUMENTS 6,614,477 B1 * 9/2003 Lee et al. ..................... 348/312

2002/0021364 A1 * 2/2002 Asada et al. ................. 348/312
2003/0146981 A1 * 8/2003 Bean et al. ................ 348/222.1
2005/0012827 A1   1/2005 Nakasuji et al.
2005/0162529 A1   7/2005 Nakasuji et al.

FOREIGN PATENT DOCUMENTS

| JP | 10- 36238 | 5/1998 |
| JP | 10 136268 | 5/1998 |
| JP | 10 136345 | 5/1998 |
| JP | 2000-125210 | 4/2000 |
| JP | 2002 10243 | 1/2002 |
| JP | 2002 271671 | 9/2002 |
| JP | 2002-314863 | 10/2002 |
| JP | 2003 69897 | 3/2003 |
| JP | 2003-179792 | 6/2003 |
| WO | WO 03 026282 | 3/2003 |

* cited by examiner

*Primary Examiner*—Tuan V Ho
*Assistant Examiner*—Selam T Gebriel
(74) *Attorney, Agent, or Firm*—Frommer Lawrence & Haug LLP; William S. Frommer; Ellen Marcie Emas

(57) ABSTRACT

An image signal generator generates an imaging signal having a frame rate that is controlled to be variable. A frame rate converter generates a monitor image signal. Upon receiving communication information from an external source, a controller controls the operations of the image signal generator and the frame rate converter on the basis of the communication information. When an instruction to specify the frame rate of the monitor image signal is given from a user interface, the controller controls the frame rate converter to generate a monitor image signal having a specified frame rate by giving priority to this instruction over the communication information.

12 Claims, 6 Drawing Sheets

FIG. 3

| VARIABLE FRAME RATE FRc | NUMBER OF FRAMES ADDED FA | IMAGING FRAME RATE FRp = FRc × FA |
|---|---|---|
| 60P≧FRc>30P | 1 | 60P≧FRp>30P |
| 30P≧FRc>20P | 2 | 60P≧FRp>40P |
| 20P≧FRc>15P | 3 | 60P≧FRp>45P |
| 15P≧FRc>12P | 4 | 60P≧FRp>48P |
| 12P≧FRc>10P | 5 | 60P≧FRp>50P |
| 10P≧FRc>6P | 6 | 60P≧FRp>36P |
| 6P≧FRc>5P | 10 | 60P≧FRp>50P |
| 5P≧FRc>4P | 12 | 60P≧FRp>48P |
| 4P≧FRc>3P | 15 | 60P≧FRp>45P |
| 3P≧FRc>2P | 20 | 60P≧FRp>40P |
| 2P≧FRc>1P | 30 | 60P≧FRp>30P |
| 1P | 60 | 60P |

IMAGE PICKUP APPARATUS AND CONTROL METHOD THEREFOR

BACKGROUND OF THE INVENTION

1. Field of the Invention

The present invention relates to an image pickup apparatus and a control method therefor.

2. Description of the Related Art

Conventionally, in film production, to achieve special video effects, filming is performed while changing the speed of filming with a film camera, that is, changing the number of frames per second. For example, when filming is performed faster than normal speed, and when playback operation is performed at normal speed, slow-motion playback images can be obtained. With this technique, high speed operation, such as a scene in which droplets are falling onto a water surface, can be easily and meticulously observed. Conversely, when filming is performed slower than normal speed, and when playback operation is performed at normal speed, fast-motion playback images can be obtained. With this technique, a sense of speed in, for example, battle scenes or car chase scenes, can be increased so that the scenes become more realistic and have a greater impact.

In television program production, imaging, editing, and transmission of programs is being digitized. Due to the development of digital technologies, the image quality is becoming higher and the cost of devices for producing programs is becoming lower. Digitization of film production is also improving.

Because of the digitization of television programs or film production, when imaging with an image pickup apparatus (video camera), the frame rate can be changed to easily obtain special video effects, for example, fast-motion playback operation or slow-motion playback operation. Such an image pickup apparatus is disclosed in, for example, Japanese Unexamined Patent Application Publication No. 2000-125210. When imaging at a frame rate lower than a predetermined frame rate by using this image pickup apparatus and when performing playback at the predetermined frame rate, fast-motion playback images can be easily obtained. In contrast, when imaging at a frame rate higher than a predetermined frame rate and when performing playback at the predetermined frame rate, slow-motion playback images can be easily obtained.

A camera controller or a signal recorder can be connected to an image pickup apparatus. In this case, part of the operation of the image pickup apparatus, for example, signal processing, such as γ correction, can sometimes be controlled not only by an operator using the image pickup apparatus but also by the camera controller or the signal recorder. It is now assumed that the frame rate of the image pickup apparatus can be controlled by the camera controller or the signal recorder. In this case, monitor images displayed on an image display device, for example, an electronic viewfinder or a monitor device, connected to or provided for the image pickup apparatus are not always controlled at a frame rate suitable for the operator to check the images that are being captured. For example, when a fast moving subject is imaged, the frame rate is decreased. In this case, if the frame rate of monitor images is also decreased, the interval for updating the monitor images becomes long, thereby making it difficult for the operator to properly image while following the subject.

SUMMARY OF THE INVENTION

Accordingly, it is an object of the present invention to provide an image pickup apparatus in which monitor images can be displayed at a frame rate desired by an operator regardless of communication information supplied from an external source to control the operation of the image pickup apparatus.

In order to achieve the above object, according to one aspect of the present invention, there is provided an image pickup apparatus including: imaging signal generating means for generating an imaging signal having a frame rate that is controlled to be variable; monitor image signal generating means for generating a monitor image signal representing the same image as the image represented by the imaging signal; a user interface used for specifying a frame rate of the monitor image signal; and control means for controlling operations of the imaging signal generating means and the monitor image signal generating means on the basis of communication information from an external source and an instruction from the user interface. The control means controls the frame rate of the monitor image signal by giving priority to the instruction from the user interface over the communication information.

According to another aspect of the present invention, there is provided an image pickup apparatus including: an imaging signal generator for generating an imaging signal having a frame rate that is controlled to be variable; a monitor image signal generator for generating a monitor image signal representing the same image as the image represented by the imaging signal; a user interface used for specifying a frame rate of the monitor image signal; and a controller for controlling operations of the imaging signal generator and the monitor image signal generator on the basis of communication information from an external source and an instruction from the user interface. The controller controls the frame rate of the monitor image signal by giving priority to the instruction from the user interface over the communication information.

According to still another aspect of the present invention, there is provided a method for controlling an image pickup apparatus. The method includes: a first generating step of generating an imaging signal having a frame rate that is controlled to be variable; a second generating step of generating a monitor image signal representing the same image as the image represented by the imaging signal; and a control step of controlling operations of the first generating step and the second generating step on the basis of communication information from a source outside the image pickup apparatus and an instruction from a user interface provided for the image pickup apparatus. In the control step, the frame rate of the monitor image signal is controlled by giving priority to the instruction from the user interface over the communication information.

BRIEF DESCRIPTION OF THE DRAWINGS

FIG. 3 illustrates the relationship of the number of frames added and the imaging frame rate to the variable frame rate;

DESCRIPTION OF THE PREFERRED EMBODIMENTS

Figure 1:
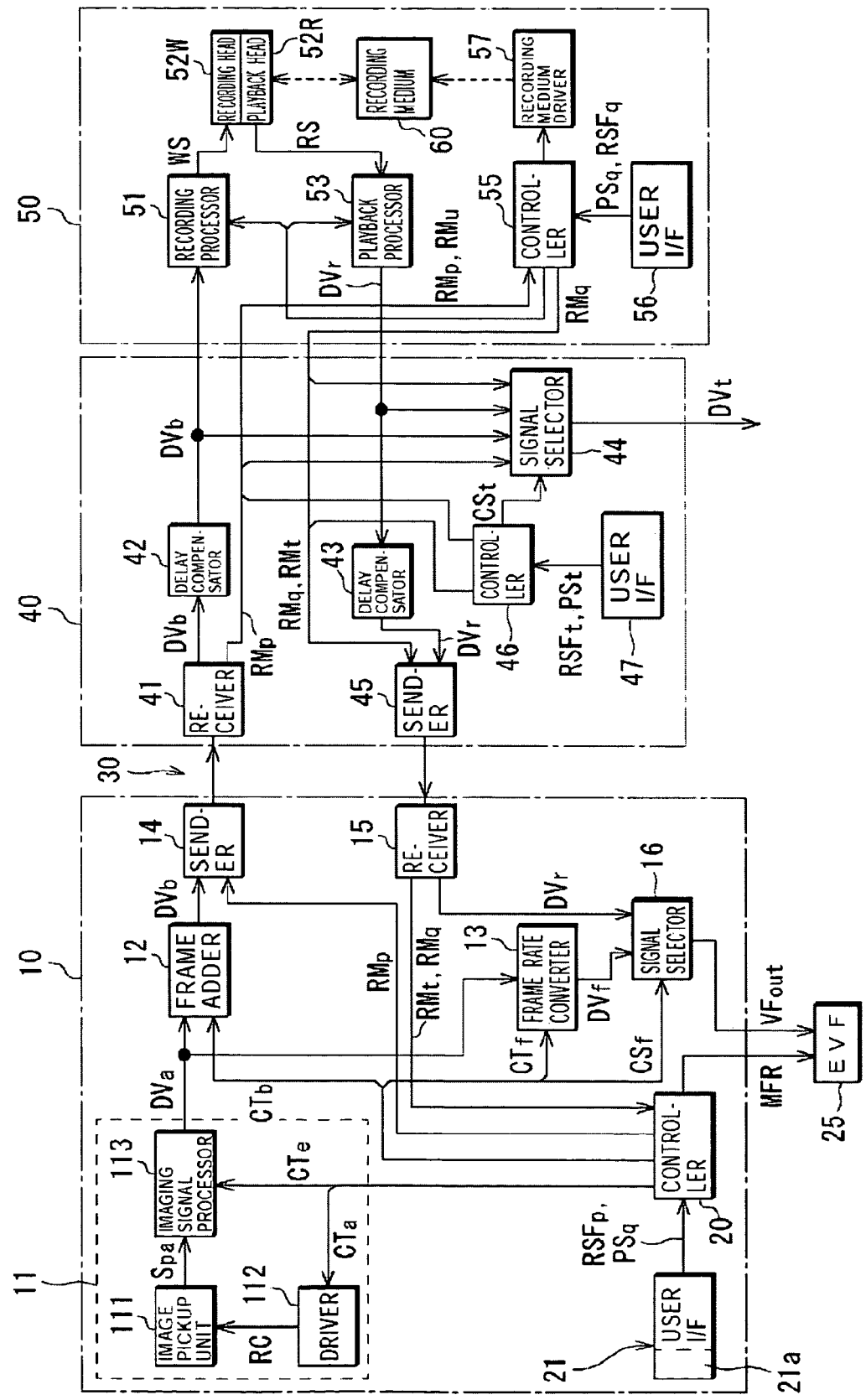
FIG. 1 illustrates an example of the configuration of an image pickup system.

The present invention is described in detail below with reference to the accompanying drawings through illustration of a preferred embodiment. An image pickup system shown in FIG. 1 includes an image pickup apparatus 10, a camera controller 40, and a recorder/player 50.

In the image pickup apparatus 10, on the imaging surface of an image pickup device (not shown) forming an image pickup unit 111 of an image signal generator 11, an image of a subject generated from light incident on the imaging surface through an imaging lens (not shown) is formed. The image pickup device photoelectrically converts the subject image into imaging electric charge, and further converts the imaging electric charge into a voltage signal on the basis of a drive control signal RC supplied from a driver 112. The image pickup device then supplies this voltage signal to an imaging signal processor 113 as an imaging signal Spa.

The driver 112 generates the drive control signal RC on the basis of a control signal CTa supplied from a controller 20, which is described below, and supplies the drive control signal RC to the image pickup unit 111.

The imaging signal processor 113 amplifies the imaging signal Spa and then removes noise components from the signal Spa. The imaging signal processor 113 then converts the image signal into a digital signal, and performs, for example, feedback clamping, flare correction, correction for defects of the image pickup device, and processing operations on the digital signal so as to generate an image signal DVa. In the present invention, however, the provision of the imaging signal processor 113 is not essential. The image signal DVa is supplied to a frame adder 12 and a frame rate converter 13. The signal processing operation performed by the imaging signal processor 113 is controlled on the basis of a control signal CTe supplied from the controller 20.

The frame adder 12 performs frame addition on the image signal DVa by using random access memories (RAMs) so as to change the frame rate of the image signal DVa. The number of frames added in this frame addition is controlled by an addition control signal CTb supplied from the controller 20.

If, for example, three frames are added, the first frame of the image signal DVa is stored in a RAM-1. Then, the pixels (signal) stored in this RAM-1 are read out and are added to the corresponding pixels of the second frame of the image signal DVa, and the resulting addition signal is stored in a RAM-2. The addition signal stored in the RAM-2 is then read out and is added to the third frame of the image signal DVa, and the resulting addition signal is stored in a RAM-3. The signal stored in the RAM-3 is a signal obtained by adding three frames of the image signal DVa, and if the level of this signal is multiplied by ⅓, a signal having a required level with ⅓ the frame rate can be obtained.

Similarly, the fourth frame of the image signal DVa is stored in the RAM-1. Then, the signal stored in the RAM-1 is read out and is added to the fifth frame of the image signal DVa, and the resulting addition signal is then stored in the RAM-2. The addition signal stored in the RAM-2 is read out and is added to the sixth frame of the image signal DVa, and the resulting addition signal is then stored in the RAM-3. The signal stored in the RAM-3 is a signal obtained by adding three frames of the image signal DVa, and if the level of this signal is multiplied by ⅓, a signal having a required level with ⅓ the frame rate can be obtained. In this manner, an image signal DVb having a required signal level obtained by adding three frames of the image signal DVa can be generated. This image signal DVb forms an imaging signal.

The above-described frame addition can also be performed by using a frame delay circuit. For example, the first frame of the image signal DVa is delayed by two frame periods in the frame delay circuit, and then, the second frame of the image signal DVa is delayed for one frame period in the frame delay circuit. The delayed first frame and second frame of the image signal DVa are then added to the third frame of the image signal DVa, thereby obtaining the three added frames of the image signal DVa. If the level of this signal is multiplied by ⅓, the image signal DVb having a required level with ⅓ the frame rate of the image signal DVa can be obtained.

By performing the frame addition as described above, when the frame rate of the image signal DVa is 60 P (which means that there are 60 frames per second and P indicates a progressive-scanning signal and the same applies to other indications), the image signal DVb having the frame rate 30 P can be obtained if the number of frames added is two. If the number of frames added is four, the image signal DVb having the frame rate 15 P can be obtained.

In addition to the switching of the number of frames added, the signal to be read out from the image pickup device can be controlled so as to change the frame rate of the imaging signal Spa. Then, the frame rate of the image signal DVb can be sequentially changed. As a result, the image signal DVb indicating an image picked up by the image pickup device at a desired frame rate can be generated. The image signal DVb generated in the frame adder 12 is then supplied to a sender 14.

The frame rate converter 13 converts the frame rate of the image signal DVa by, for example, controlling the reading and writing of an image signal from and into the RAM, on the basis of a conversion control signal CTf supplied from the controller 20. The frame rate converter 13 then supplies the image signal having the converted frame rate to a signal selector 16 as a monitor image signal DVf. Although the frame rate of the monitor image signal DVf is sometimes different from that of the imaging signal, the image represented by the monitor image signal DVf is the same as the imaging signal.

Figure 2:
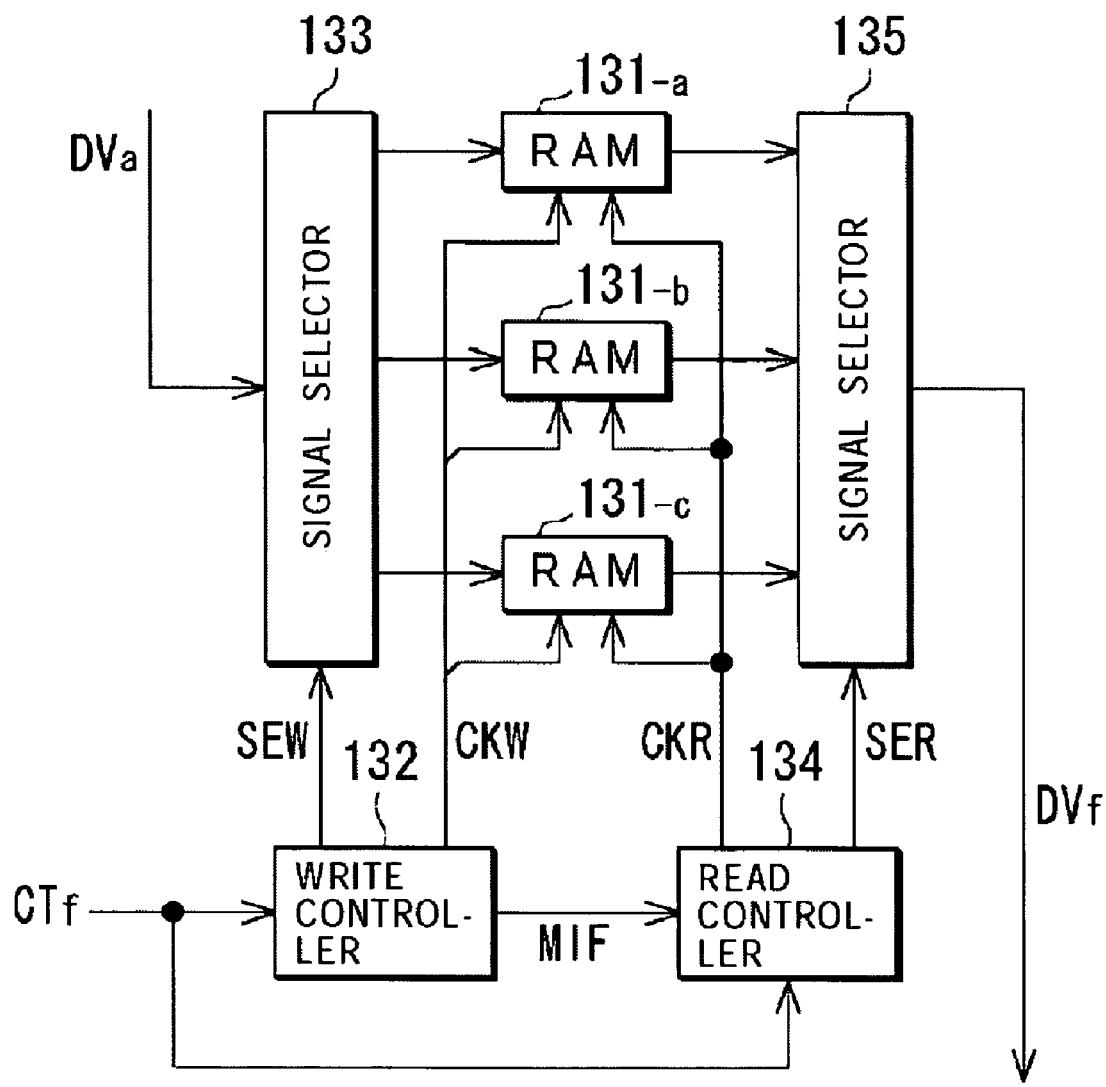
FIG. 2 illustrates a frame rate converter.

FIG. 2 illustrates the configuration of the frame rate converter 13. The frame rate converter 13 sequentially writes the supplied image signal DVa into, for example, three RAMs 131-a, 131-b, and 131-c in units of frames. The frame rate converter 13 also reads out the image signals stored in the RAMs 131-a, 131-b, and 131-c by sequentially selecting the RAMs 131-a, 131-b, and 131-c on the basis of the conversion control signal CTf, thereby generating the monitor image signal DVf having the converted frame rate.

A write controller 132 generates a selection signal SEW for selecting the RAM into which the image signal DVa is written and a write control signal CKW for writing the image signal DVa into the RAM on the basis of the conversion control signal CTf. The selection signal SEW is supplied to a signal selector 133. The write control signal CKW is supplied to the RAM into which the image signal DVa is written. The write controller 132 also generates a write information signal MIF indicating the write state of the image signal DVa in each RAM, and supplies the write information signal MIF to a read controller 134.

The signal selector 133 supplies the image signal DVa to the RAM selected by the selection signal SEW, and the RAM writes the image signal DVa thereinto on the basis of the write control signal CKW.

The read controller 134 generates a read control signal CKR on the basis of the conversion control signal CTf. This read control signal CKR is used for reading the image signal with a converted frame rate from the RAM. The read controller 134 generates a selection signal SER for selecting the RAM from which the image signal is read on the basis of the conversion control signal CTf and the write information signal MIF. The selection signal SER is supplied to a signal selector 135. The read control signal CKR is supplied to all the RAMs or to the RAM from which the image signal is read.

Upon receiving the read control signal CKR, the RAM reads the stored image signal on the basis of the read control signal CKR and supplies the image signal to the signal selector 135. The signal selector 135 then selects the image signal output from the RAM selected by the selection signal SER, and outputs the image signal as a monitor image signal DVf.

The reading of the image signals from the RAMs is performed as follows. The read controller 134 generates the selection signal SER so that the RAM into which the image signal was last written is detected on the basis of the write information signal MIF and that the detected RAM can be selected as the RAM from which the image signal is subsequently read. After reading the image signal for one frame from the RAM and when detecting that the image signal of the subsequent frame has not been written on the basis of the write information signal MIF, the image signal of the same frame continues to be read without changing the RAM. By controlling the reading of the image signals as described above, when decreasing the frame rate of the image signal DVa, the number of frames of the image signal DVa is reduced so as to generate the monitor image signal DVf with a lower frame rate. When increasing the frame rate of the image signal DVa, the number of frames of the image signal DVa is increased by repeating the image signal DVa in units of frames so as to generate the monitor image signal DVf with a higher frame rate.

The sender 14 is connected to a receiver 41 of the camera controller 40 via a transmission channel 30, and supplies the image signal DVb and communication information RMp output from the controller 20 to the camera controller 40.

A receiver 15 is connected to a sender 45 of the camera controller 40 via the transmission channel 30, and receives a playback image signal DVr from the camera controller 40 and supplies it to the signal selector 16. The receiver 15 also receives communication information RMt and RMq from the camera controller 40 and supplies them to the controller 20.

The signal selector 16 selects the monitor image signal DVf and the playback image signal DVr on the basis of the selection signal CSf from the controller 20, and supplies the selected signal to an image display device, for example, an electronic viewfinder 25, as a monitor output signal FVout.

A user interface 21, which is formed of a button switch or a graphical user interface (GUI), is connected to the controller 20. Upon receiving an operation signal PSp in response to a user operation through this user interface 21, the controller 20 generates the control signals CTa and CTb on the basis of the operation signal PSp so as to control the operations of the individual elements. As a result, the image pickup apparatus 10 can operate in response to the user operation.

Upon receiving through the user interface 21 a frame rate instruction signal RSFp indicating the frame rate of the image signal DVb output from the frame adder 12 or the frame rate of the monitor image signal DVf, the controller 20 generates the control signal CTa, the addition control signal CTb, and the conversion control signal CTf on the basis of the frame rate instruction signal RSFp. For example, when the frame rate instruction signal RSFp is supplied to the controller 20 as the operation signal PSq after changing the frame rate during the imaging operation, or when the frame rate instruction signal RSFp is supplied to the controller 20 from a remote controller, the controller 20 generates the control signal CTa in response to the frame rate instruction signal RSFp and supplies the control signal CTa to the driver 112. The controller 20 also generates the addition control signal CTb and supplies it to the frame adder 12, and also generates the conversion control signal CTf and supplies it to the frame rate converter 13.

Upon receiving the communication information RMt and RMq via the receiver 15, the controller 20 generates the control signal CTa, the addition control signal CTb, and the conversion control signal CTf on the basis of the communication information RMt and RMq.

The controller 20 also generates a selection signal CSf on the basis of the operation signal PSq and the communication information RMt and RMq, and also generates a frame rate signal MFR indicating the frame rate of a monitor output signal VFout, and supplies the frame rate signal MFR to the electronic viewfinder 25. The controller 20 also generates communication information RMp for controlling the operation of the camera controller 40 or the recorder/player 50 if necessary.

The user interface 21 is provided with an operation mode setting portion 21a. When this operation mode setting portion 21a is operated to set the priority control mode, the controller 20 controls the frame rate converter 13 on the basis of the frame rate instruction signal RSFp regardless of the communication information RMt and RMq. Alternatively, priority may always be given to the control by the user interface 21 by eliminating the priority control mode setting function.

The electronic viewfinder 25 determines the frame rate of the monitor output signal VFout on the basis of the frame rate signal MFR, and displays the corresponding image with the determined frame rate on the basis of the monitor output signal VFout. If the electronic viewfinder 25 can automatically detect the frame rate of the monitor output signal VFout, a correct image can be displayed on the basis of the monitor output signal VFout without supplying the frame rate signal MFR to the electronic viewfinder 25 from the controller 20.

The camera controller 40 supplies the image signal DVb received by the receiver 41 to a delay compensator 42. The delay compensator 42 compensates for a delay of the image signal DVb generated in the transmission channel 30, and supplies the resulting image signal DVb to a signal selector 44 and a recording processor 51 of the recorder/player 50. The communication information RMp received by the receiver 41 is supplied to the signal selector 44 and a controller 55 of the recorder/player 50.

The playback image signal DVr supplied from the recorder/player 50 is output to a delay compensator 43. The delay compensator 43 sends the playback image signal DVr to the image pickup apparatus 10 via the sender 45 by predicting a delay generated in the transmission channel 30. Communication information RMq supplied from the controller 55 of the recorder/player 50 is output to the image pickup apparatus 10.

The signal selector 44, which is provided for the camera controller 40, selects the image signal DVb or the playback image signal DVr on the basis of the communication information RMp from the image pickup apparatus 10, the communication information RMq from the recorder/player 50, or a selection signal CSt from a controller 46, which is discussed below, and outputs the selected signal as an image signal DVt.

A user interface 47 is connected to the controller 46. Upon receiving an operation signal PSt in response to a user operation through this user interface 47, the controller 46 generates on the basis of this operation signal PSt communication information RMt for controlling the operation of the image pickup apparatus 10 and communication information RMu for controlling the operation of the recorder/player 50. The communication information RMt is supplied to the image pickup apparatus 10 via the sender 45, and the communication information RMu is supplied to the controller 55 of the recorder/player 50. The controller 46 also generates the selection signal CSt on the basis of the operation signal PSt if necessary.

The recording processor 51 of the recorder/player 50 performs processing, such as modulation and error correcting code (ECC) addition, on the supplied image signal DVb, and generates a recording signal WS and supplies it to a recording head 52W. This recording head 52W is driven by the recording signal WS so as to record the captured image on a recording medium 60. The image recorded on the recording medium 60 is read out by a playback head 52R, and a resulting read signal RS is supplied to a playback processor 53. The playback processor 53 performs ECC and demodulation, and supplies a resulting playback image signal DVr to the delay compensator 43 of the camera controller 40.

A user interface 56 is connected to the controller 55. Upon receiving an operation signal PSq in response to a user operation through this user interface 56, the controller 55 generates a control signal on the basis of this operation signal PSq so as to control the operation of the recording processor 51, the playback processor 53, and a recording medium driver 57 for driving the recording medium 60. As a result, the recorder/player 50 can operate in response to the user operation. Upon receiving the communication information RMp and RMu, the controller 55 controls the operation of the individual items on the basis of the communication information RMp and RMu. The controller 50 also generates the communication information RMq for controlling the operation of the image pickup apparatus 10 and the camera controller 40 on the basis of the operation signal PSq, and supplies the communication information RMq to the image pickup apparatus 10 and the camera controller 40.

The operation of the image pickup apparatus 10 is as follows. A description is first given of the imaging operation performed at a variable frame rate by operating the user interface 21 of the image pickup apparatus 10. The controller 20 switches the frame rate (imaging frame rate) FRp of the imaging signal Spa generated in the image pickup unit 111 and also switches the number of frames added FA in the frame adder 12 on the basis of the frame rate instruction signal RSFp input from the user interface 21. For example, as shown in FIG. 3, when the variable frame rate FRc is set as 60 P≧FRc>30 P by the frame rate instruction signal RSFp, the number of frames added FA is set to be 1 so that the imaging frame rate FRp becomes equal to the variable frame rate FRc. When the variable frame rate FRc is set as 30 P≧FRc>20 P, the number of frames added FA is set to be 2 so that the imaging frame rate FRp is twice as high as the variable frame rate FRc. When the variable frame rate FRc is set as 20 P≧FRc>15 P, the number of frames added FA is set to be 3 so that the imaging frame rate FRp is three times as high as the variable frame rate FRc. Similarly, by switching the imaging frame rate FRp and the number of frames added FA, the variable frame rate FRc can be sequentially changed, thereby generating the image signal DVb at a desired variable frame rate FRc.

When changing the frame rate of the imaging signal Spa, the electric charge storage period in the image pickup device or the reading timing of the electric charge can be controlled by the drive control signal RC supplied to the image pickup unit 111 from the driver 112. When changing the imaging frame rate FRp, a common data rate (CDR) common sampling frequency) system can be used for adjusting the horizontal blanking period or the vertical blanking period. With this arrangement, the image size of the imaging signal Spa in the effective frame period is not changed even if the imaging frame rate FRp is varied. With the use of the CDR system, the operating frequencies of the elements using the imaging frame rate FRp do not have to be changed even if the imaging frame rate FRp is varied. Thus, the configuration of the image pickup apparatus 10 can be simplified.

Figure 4:
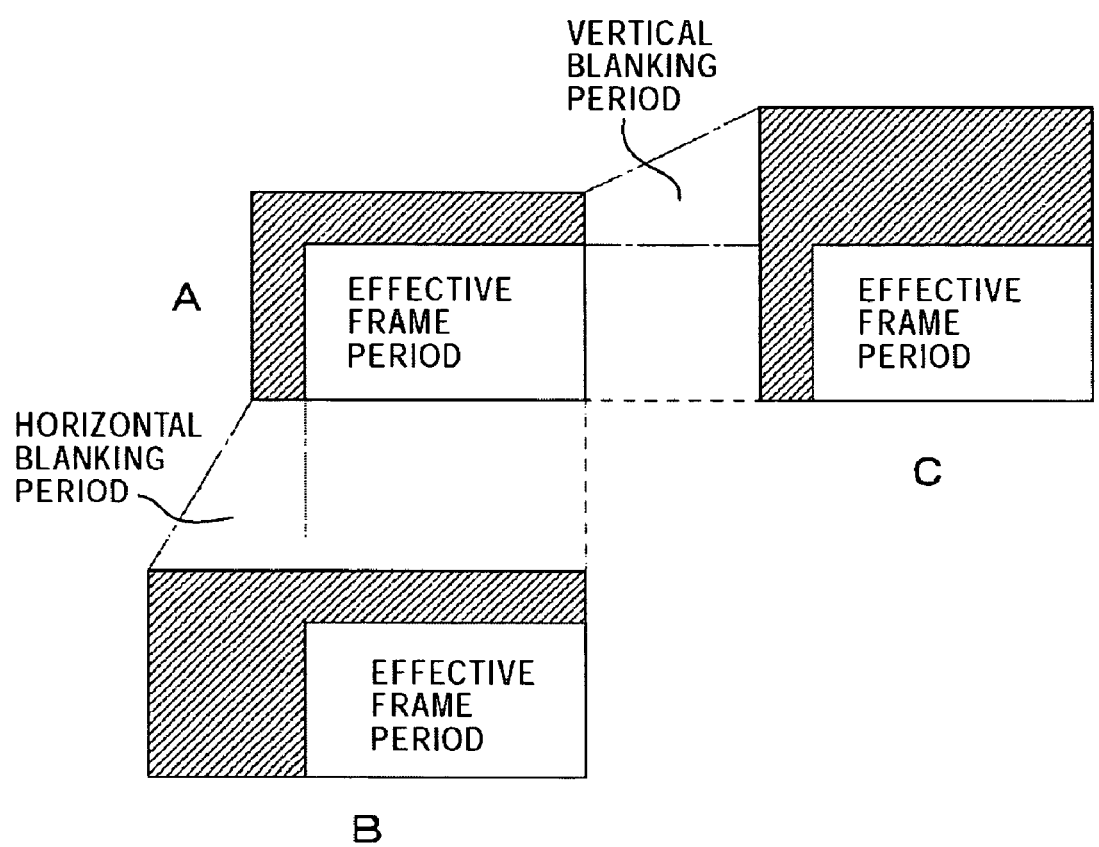
FIG. 4 illustrates a common data rate (CDR) system.

The CDR system is discussed briefly below. An image signal having the horizontal and vertical blanking periods and the effective frame period is shown in A of FIG. 4. By adjusting the horizontal blanking period as indicated by B of FIG. 4 or by adjusting the vertical blanking period as indicated by C of FIG. 4, the frame rate FRp of the imaging signal Spa can be changed without changing the image size of the effective frame period. The CDR system is disclosed in PCT Application Nos. PCT/JP03/00550 and PCT/JP03/00551 filed for by the same assignee of this invention.

Figure 5:
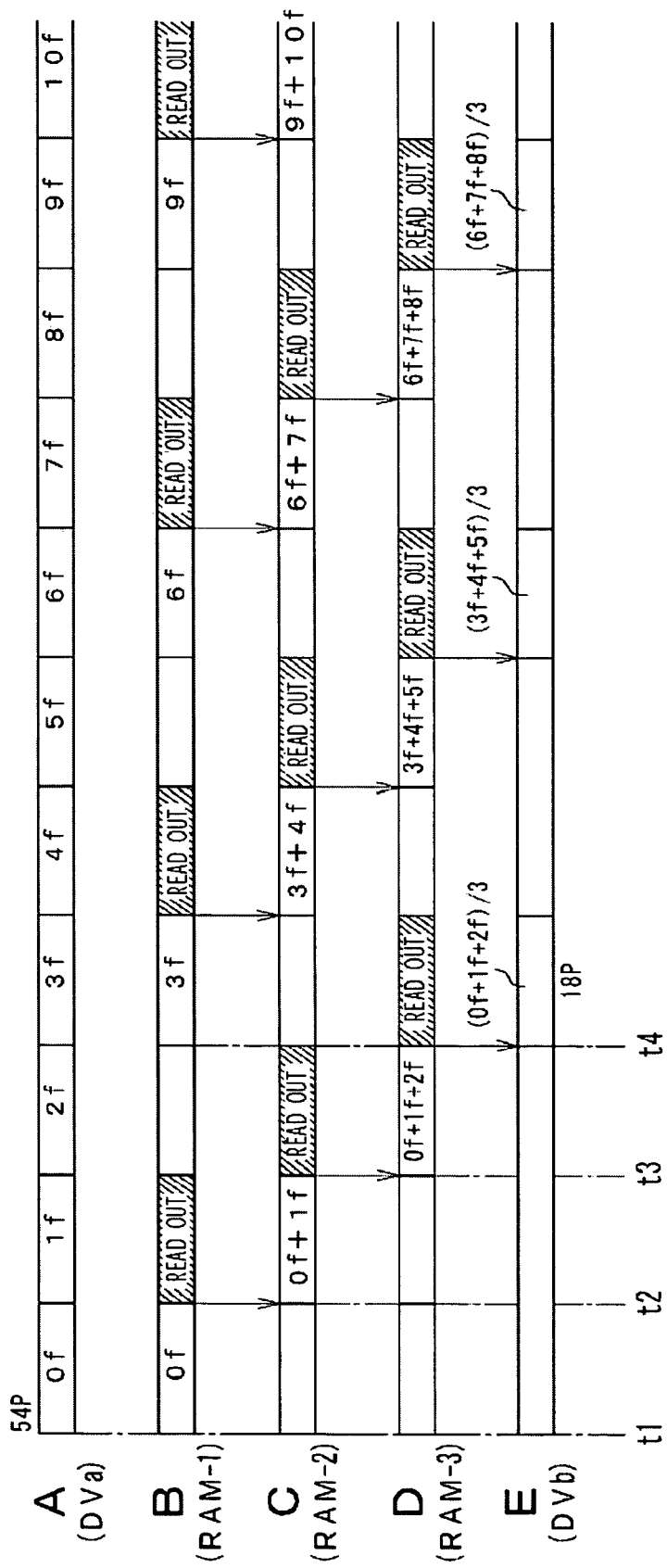
FIG. 5 illustrates the operation for generating an image signal DVb.

FIG. 5 illustrates the operation for generating the image signal DVb by adding frames using the RAM-1 through RAM-3 and an adder as described above. For example, if the variable frame rate FRc is 18 P, as shown in FIG. 3, the imaging frame rate FRp is 54 P and the number of frames added FA is 3. In FIG. 5, A indicates the frames of the image signal DVa; B represents the operation of the RAM-1; C designates the operation of the RAM-2; D indicates the operation of the RAM-3; and E represents the frames of the image signal DVb.

At time t1 when the frame 0f of the image signal DVa is started, the frame adder 12 sets the RAM-1 to be the write RAM, and writes the image signal DVa of the frame 0f into the RAM-1.

At time t2 when the frame 0f of the image signal DVa is finished and the frame 1f is started, the frame adder 12 sets the RAM-1 as the internal read RAM and changes the write RAM from the RAM-1 to the RAM-2. The frame adder 12 then reads out the signal of the frame 0f stored in the RAM-1, and adds it to the signal of the frame 1f and stores the resulting signal in the RAM-2.

At time t3 when the frame 1f of the image signal DVa is finished and the frame 2f is started, the frame adder 12 sets the RAM-2 to be the internal read RAM, and also changes the write RAM from the RAM-2 to the RAM-3. The frame adder 12 then reads out the signal stored in the RAM-2, and adds this signal to the signal of the frame 2f and stores the resulting signal in the RAM-3.

At time t4 when the frame 2f is finished and the frame 3f is started, the three frames of the image signal DVa have been added in the RAM-3, and thus, the RAM-3 is set to be the external read RAM. The frame adder 12 also sets the RAM-1 to be the write RAM and stores the image signal DVa of the frame 3f in the write RAM.

After generating the three-frame addition signal, it is read from the external read RAM, and is output as the image signal DVb by multiplying the level of the signal by ⅓.

Thereafter, similarly, a three-frame addition signal is generated by adding three frames of the image signal DVa by using the RAM-1 through RAM-3 and an adder. Then, by multiplying the level of the three-frame addition signal by ⅓, the image signal DVb having the variable frame rate FRc can be obtained.

By the conversion control signal CTf generated in response to the frame rate instruction signal RSFp, the controller 20 controls the operation of the frame rate converter 13 to convert the image signal DVa into the monitor image signal DVf having a frame rate set by the operator and to supply the monitor image signal DVf to the signal selector 16. Then, the signal selector 16 is controlled to select the monitor image signal DVf by the selection signal CSf, and outputs the monitor image signal DVf to the electronic viewfinder 25 as the monitor output signal VFout. The controller 20 also supplies the frame rate signal MFR indicating the frame rate of the monitor image signal DVf to the electronic viewfinder 25. Accordingly, the image signal DVb in response to the frame rate instruction signal RSFp can be supplied to the camera controller 40. On the screen of the electronic viewfinder 25, images that are being picked up by the image pickup apparatus 10 can be displayed with a frame rate set by the operator.

When recording the image signal DVb on the recording medium 60 by the recorder/player 50, the controller 20 supplies a recording start command to the recorder/player 50 as the communication information RMp. The controller 55 of the recorder/player 50 controls the recording processor 51 and the recording medium driver 57 on the basis of the communication information RMp to generate the recording signal WS on the basis of the image signal DVb, and supplies the recording signal WS to the recording head 52W. Thus, the image with a variable frame rate can be recorded on the recording medium 60. If the signal selector 44 of the camera controller 40 selects the image signal DVb, the image signal DVb can be output as the image signal DVt.

A description is now given of the operation for displaying an image recorded on the recording medium 60 on the electronic viewfinder 25. When displaying an image on the electronic viewfinder 25, a playback start command is supplied from the controller 20 to the controller 55 of the recorder/player 50 as the communication information RMp. The controller 55 then controls the playback processor 53 and the recording medium driver 57 on the basis of the communication information RMp to read the signal recorded on the recording medium 60 by using the playback head 52R, and supplies the signal to the playback processor 53. The playback image signal DVr obtained in the playback processor 53 is also supplied to the image pickup apparatus 10.

The controller 20 of the image pickup apparatus 10 controls the signal selector 16 to select the playback image signal DVr according to the selection signal CSf, and supplies it to the electronic viewfinder 25 as the monitor output signal VFout. The controller 20 also outputs the frame rate signal MFR to inform the electronic viewfinder 25 of the frame rate of the monitor output signal VFout, and controls the electronic viewfinder 25 to display the playback image. The controller 20 may output the communication information RMp to control the signal selector 44 of the camera controller 40 to output the playback image signal DVr as the image signal DVt.

If imaging operation has been performed at the variable frame rate FRc of 24 P and if the image signal recorded on the recording medium 60 is played back at 24 P, the motion of the subject in the playback image becomes equal to that of the actual subject. If imaging operation has been performed at the variable frame rate FRc higher than 24 P and if the image signal is played back at 24 P, the motion of the subject in the playback image becomes lower than that of the actual subject. If imaging operation has been performed at the variable frame rate FRc lower than 24 P and if the image signal is played back at 24 P, the motion of the subject in the playback image becomes higher than that of the actual subject. Accordingly, on the screen of the electronic viewfinder 25, the playback image moving at different frame rates according to the frame rate instruction signal RSFp can be displayed.

A description is now given of the control operation for the image pickup apparatus 10 from the user interface 47 of the camera controller 40. The controller 46 generates the communication information RMq on the basis of the frame rate instruction signal RSFt input from the user interface 47. The controller 46 then supplies the communication information RMq to the controller 20 of the image pickup apparatus 10 so as to inform the controller 20 of the variable frame rate FRc or the frame rate of the monitor image signal DVf input from the user interface 47.

The controller 20 controls the operation of the image signal generator 11 and the frame adder 12 so that the frame rate of the image signal DVb output from the image pickup apparatus 10 becomes equal to the variable frame rate FRc instructed through the user interface 47. The controller 20 also controls the frame rate converter 13 by the conversion control signal CTf so that the target frame rate of the monitor image signal DVf can be reached. The controller 20 also controls the signal selector 16 to output the monitor image signal DVf by the selection signal CSf as the monitor output signal VFout. The frame rate signal MFR indicating the frame rate of the monitor output signal DVf is also supplied to the electronic viewfinder 25.

If the frame rate of the monitor image signal DVf is specified from the user interface 21 of the image pickup apparatus 10, the controller 20 preferentially sets this frame rate instruction signal RSFp over the communication information RMt to be the frame rate of the monitor image signal DVf. For example, if the operator supplies the frame rate instruction signal RSFp indicating the frame rate of the monitor image signal DVf to the controller 20 through the user interface 21, priority is given to the frame rate instruction signal RSFp over the communication information RMt. In this case, if the monitor image is not displayed at a frame rate desired by the operator, the operator can supply the frame rate instruction signal RSFp to the controller 20 through the user interface 21. Then, the monitor image can be changed to a desired frame rate.

The operation mode setting portion 21a of the user interface 21 can be operated to set the priority control mode. In this case, during the priority control mode, priority is given to the frame rate instruction signal RSFp by invalidating the frame rate control of the monitor image signal DVf through the communication information. Accordingly, the operator can display monitor images at a desired frame rate without changing the frame rate of the monitor image signal DVf through the communication information. Alternatively, the frame rate of the monitor image signal DVf may be stored in, for example, the controller 20 of the image pickup apparatus 10 through the user interface 21, and when the priority control mode is set, the monitor image signal DVf can be generated with the stored frame rate. With this arrangement, when the priority control mode is set, the monitor image signal DVf can be automatically generated with a desired frame rate. This eliminates the operation for setting the monitor image signal DVf to a desired frame rate after setting the priority control mode.

As a result of controlling the frame rate of the monitor image signal DVf as described above, the image signal DVb having a variable frame rate set by the camera controller 40 can be output from the image pickup apparatus 10, and also, images that are being picked by the image pickup apparatus 10 can be displayed on the electronic viewfinder 25 at a frame rate specified by the operator.

The above-described control operation can be applied when the operation of the image pickup apparatus 10 is controlled from the user interface 56 of the recorder/player 50.

More specifically, the controller 55 generates the communication information RMq on the basis of the frame rate instruction signal RSFq input from the user interface 56. The controller 55 then supplies the communication information RMq to the controller 20 of the image pickup apparatus 10 so as to inform the controller 20 of the variable frame rate FRc and the frame rate of the monitor image signal DVf specified from the user interface 56.

The controller 20 controls the operation of the image signal generator 11 and the frame adder 12 on the basis of the communication information RMq so that the frame rate of the image signal DVb becomes equal to the specified variable frame rate FRc. The controller 20 also controls the operation of the frame rate converter 13 by using the conversion control signal CSf so that the frame rate of the monitor image signal DVf becomes the frame rate specified by the recorder/player 50. The controller 20 also controls the signal selector 16 to output the monitor image signal DVf as the monitor output signal VFout by the selection signal CSf. The frame rate signal MFR indicating the frame rate of the monitor output signal VFout is also supplied to the electronic viewfinder 25.

In this case, if the frame rate of the monitor image signal DVf is specified through the user interface 21, priority is given to the specified frame rate over the communication information RMq. Accordingly, the image signal DVb having a variable frame rate set in the recorder/player 50 can be output from the image pickup apparatus 10, and images that are picked up by the image pickup apparatus 10 can be displayed on the electronic viewfinder 25 as monitor images at a frame rate specified by the operator.

Figure 6:
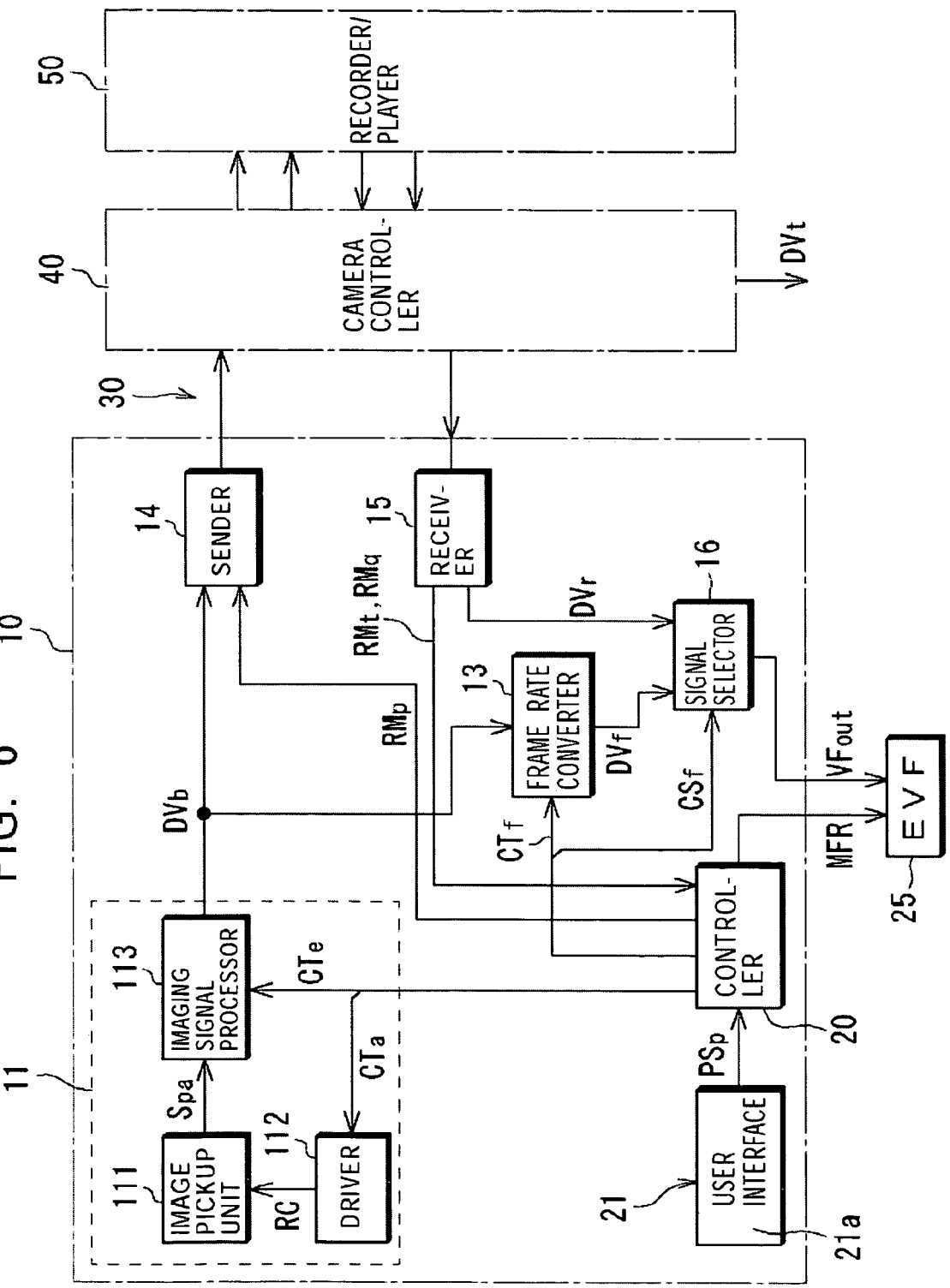
FIG. 6 illustrates another example of the configuration of the image pickup system.

In the above-described image pickup apparatus 10, the frames of the image signal DVa are added to generate the image signal DVb having a desired variable frame rate. As shown in FIG. 6, however, the image signal DVb having a desired variable frame rate may be generated in the image signal generator 11 and may be output from the sender 14. In this case, the controller 20 controls by the control signal CTa so that the frame rate of the imaging signal Spa output from the image pickup unit 111 becomes equal to the frame rate of the image signal DVb. One of the camera controller 40 and the recorder/player 50 may be connected to the image pickup apparatus 10 so as to construct an image pickup system, though it is not shown.

In the above-described embodiment, the frame adder 12 performs frame addition on the image signal DVa to make the frame rate of the image signal DVa variable so as to generate the image signal DVb. The frame converter 13 controls the reading and writing of the image signal DVa from and into the RAM so as to generate the monitor image signal DVf having a variable frame rate from the image signal DVa. However, different approaches may be taken to generate the image signal DVb and the monitor image signal DVf. For example, the monitor image signal DVf may be generated by frame addition, and the image signal DVb may be generated by controlling the reading and writing of the signal from and into the RAM. Alternatively, another approach may be taken to change the frame rate; for example, interpolation images may be generated by motion prediction to increase the number of frames, thereby increasing the frame rate.

As described above, for the monitor image signal DVf indicating the images that are being captured, priority is given to a frame rate specified through a user interface of the image pickup apparatus over the external communication information. Accordingly, the monitor image signal DVf having a frame rate specified by the image pickup apparatus can be generated regardless of the communication information. Thus, even if communication information is externally supplied to the image pickup apparatus to control the frame rate of an image signal, images that is being captured can be displayed on an image display device, for example, an electronic viewfinder, as monitor images at a frame rate desired by the operator. This enables the operator to easily perform the imaging operation by checking monitor images.

What is claimed is:

1. An image pickup apparatus comprising:
    imaging signal generating means for generating an imaging signal having a frame rate that is controlled to be variable;
    monitor image signal generating means for generating a monitor image signal representing the same image as the image represented by the imaging signal;
    a user interface used for specifying a frame rate of the monitor image signal; and
    control means for controlling operations of the imaging signal generating means and the monitor image signal generating means on the basis of communication information from an external source and an instruction from the user interface,
    wherein the control means (a) controls the frame rate of the monitor image signal by giving the instruction from the user interface priority over the communication information, and (b) controls the frame rate of an output of the imaging signal to the external source according to the communication information.

2. The image pickup apparatus according to claim 1, wherein the user interface comprises an operation mode setting function, and, when the operation mode setting function sets the operation mode to be a priority control mode, the control means gives priority to the instruction from the user interface by invalidating the control of the frame rate of the monitor image signal through the communication information during the priority control mode.

3. The image pickup apparatus according to claim 1, wherein the imaging signal generating means comprises an image pickup device and frame addition means for adding frames of an output of the image pickup device, and the monitor image signal generating means comprises frame rate conversion means for converting an output signal of the image pickup device.

4. An image pickup apparatus comprising:
    an imaging signal generator for generating an imaging signal having a frame rate that is controlled to be variable;
    a monitor image signal generator for generating a monitor image signal representing the same image as the image represented by the imaging signal;
    a user interface used for specifying a frame rate of the monitor image signal; and
    a controller for controlling operations of the imaging signal generator and the monitor image signal generator on the basis of communication information from an external source and an instruction from the user interface,
    wherein the controller (a) controls the frame rate of the monitor image signal by giving the instruction from the user interface priority over the communication information, and (b) controls the frame rate of an output of the imaging signal to the external source according to the communication information.

5. The image pickup apparatus according to claim 4, wherein the user interface comprises an operation mode setting function, and, when the operation mode setting function sets the operation mode to be a priority control mode, the controller gives priority to the instruction from the user interface by invalidating the control of the frame rate of the monitor image signal through the communication information during the priority control mode.

6. The image pickup apparatus according to claim 4, wherein the imaging signal generator comprises an image pickup device and a frame adder for adding frames of an output of the image pickup device, and the monitor image signal generator comprises a frame rate converter for converting an output signal of the image pickup device.

7. A method for controlling an image pickup apparatus, comprising:
- a first generating step of generating an imaging signal having a frame rate that is controlled to be variable;
- a second generating step of generating a monitor image signal representing the same image as the image represented by the imaging signal; and
- a control step of controlling operations of the first generating step and the second generating step on the basis of communication information from a source outside the image pickup apparatus and an instruction from a user interface provided for the image pickup apparatus,
- wherein, in the control step, (a) the frame rate of the monitor image signal is controlled by giving the instruction from the user interface priority over the communication information, and (b) the frame rate of an output of the imaging signal to the external source is controlled according to the communication information.

8. The method according to claim 7, wherein the user interface comprises an operation mode setting function, and, when the operation mode setting function sets the operation mode to be a priority control mode, in the control step, priority is given to the instruction from the user interface by invalidating the control of the frame rate of the monitor image signal through the communication information during the priority control mode.

9. The method according to claim 7, wherein, in the first generating step, frames of an output of an image pickup device are added, and in the second generating step, a frame rate of an output signal of the image pickup device is converted.

10. The image pickup apparatus according to claim 1, further comprising a receiving means for receiving the communication information from the external source.

11. The image pickup apparatus according to claim 4, further comprising a receiving device for receiving the communication information from the external source.

12. The method according to claim 7, further comprising the step of receiving the communication information from the external source.

* * * * *